July 17, 1962 D. O. MELROY 3,045,145
TRAVELING WAVE TUBE
Filed Jan. 4, 1960

INVENTOR
D. O. MELROY
BY David P. Kelley
ATTORNEY 3,045,145

TRAVELING WAVE TUBE

David O. Melroy, Springfield, N.J., assignor to Bell Telephone Laboratories, Incorporated, New York, N.Y., a corporation of New York Filed Jan. 4, 1960, Ser. No. 228
7 Claims. (Cl. 315—3.5)

Figure 1:
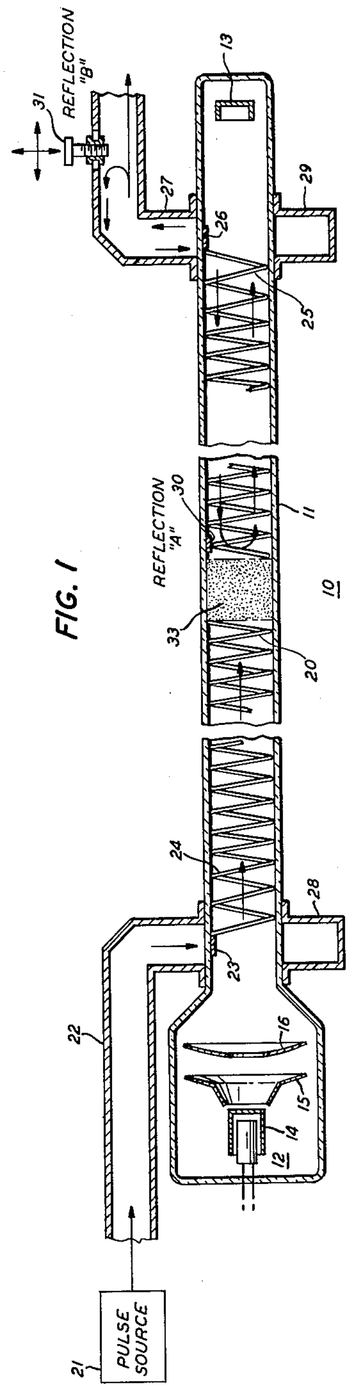

This invention relates to electron discharge devices and, more particularly, to such devices of the traveling wave tube type.

Traveling wave tubes are generally well known as very efficient amplifiers of exceedingly short input pulse signals and in such amplifiers considerable care is taken to insure the prevention of self-oscillation or undesired reflections. I have discovered, however, that the advantages of traveling wave tube amplifiers may be utilized for providing pulse rate multiplication wherein a very high repetition rate may be obtained for very short or abrupt pulse signals.

The need for pulse rate multipliers has long been in existence for use in synchronization or time selection circuitry, the derived output pulse train finding particular use as time markers, to form codes for identification, or in channel selection, to mention but a few.

For such uses, pulse multipliers capable of generating an output train of pulses having a wave form other than sinusoidal are often desired. Specifically, wave forms that are as abrupt as possible, such as have become known as the triangle, rectangle or pulse, for example, are particularly useful in timing applications of very short duration since a definite instant in time can be associated much more accurately and unequivocally with the exact moment of "abruptness" in such wave forms than with any portion of a "smooth" wave form. Speed, relative of course to the time scale being used, is therefore a most valuable property of such wave forms. Another important property of such wave forms is their amplitude which, in many cases, determines to a large extent the "abruptness" of the particular wave form desired for any given time base. Of course both the speed of the desired wave and its amplitude are dependent upon the specific operating characteristics of the pulse multiplier employed.

Pulse multipliers heretofore have generally involved delay lines with either lumped constants or distributed parameters wherein multiple pulses are produced by reflections from delay line terminations. The distributed parameter type of delay line has been found to produce the better wave forms of the two circuits and is relatively simple to manufacture while a delay line with lumped constants is usually more compact and capable of being temperature-compensated. Typical circuitry priorly utilized for producing pulse multiplication is disclosed in the text entitled "Waveforms," volume 19 of the Massachusetts Institute of Technology Radiation Laboratories Series (1949), pages 238 through 253. Each of the delay lines involved on those pages is of course, a passive element and, thus by itself, in no way can either amplify or maintain constant the amplitude of a train of output pulses derived by reflection.

For this reason, regenerative circuits have often been utilized in combination with blocking oscillators in prior types of pulse multipliers as an expedient to provide a continuous train of substantially unattenuated output pulses at a repetition rate which is greater than that of the input pulses. While such arrangements are somewhat simpler than most well known shocked-oscillator pulse generators, the inherent shortcomings of available delay lines with lumped constants or distributed parameters in terms of bulk, poor quality and large temperature coefficients of reactance severally applicable thereto, have prevented their extensive use for pulses having a time duration even in the microsecond range, not to mention the millimicrosecond range.

Such limited use has been compounded for several collateral reasons. Firstly, since the passive delay line terminating impedance in the aforementioned circuitry is often finite with a resistive component, the pulses are not only attenuated but distorted by an amount dependent upon the quality of the line for any given repetition rate of output pulses. Secondly, as is well known, the bandwidth requirements of a pulse multiplier increase inversely with a decrease in the time duration of any generated pulse as a result of the high frequency components associated with and determinative of the rise time of any given pulse. Accordingly, any resonant circuitry, such as utilized in the aforementioned delay lines, inherently exhibits a relatively narrow bandwidth which, disadvantageously, imposes a serious limitation on the minimum time duration of any pulse that can be generated with such circuitry. Thirdly, it is well known that the efficiency and practicality of any pulse multiplier utilizing lumped or distributed reactances are directly related to the repetition rate or frequency of the output pulse train, and necessarily decrease inversely with an increase in the repetition rate of the output pulse train. This results primarily from the high resistances encountered with such circuits at very high frequencies; the high resistances being caused in large part by skin effect and radiation resistance. Further, the transit time effects associated with conventional oscillator and amplifier tubes imposes an additional problem on the practical utilization of the aforementioned pulse multiplier arrangements for very short pulses generated at extremely high repetition rates.

More recently, there has been a definite need for pulse multipliers capable of increasing the pulse rate of millimicrosecond pulses in a stable and easily controlled manner and without distorting or changing the basic or driving pulse shape. Pulse multipliers satisfying such requirements would find particular application in ultra-high frequency testing apparatus as well as in other applications.

Disadvantageously, the prior aforementioned pulse multipliers utilizing passive delay lines with either lumped or distributed reactances have proven particularly inadequate for generating such specific and demanding millimicrosecond pulses at very high repetition rates because of their inherently limited bandwith characteristics.

Accordingly, it is a general object of this invention to provide an improved travelling wave tube and specifically such a tube as a pulse rate multiplier.

It is another object of this invention to provide a traveling wave tube which can multiply the repetition rate of an input train of millimicrosecond pulses in a stable manner and without changing the basic shape of the input pulse train.

It is a further object of this invention to produce an amplified train of output pulses of millimicrosecond duration, initiated by one or more input pulses of the same duration at an extremely high repetition rate, with both the amplitude and repetition rate of the output pulses being readily controlled.

It is an additional object of this invention to generate multiple output pulses at a high repetition rate initiated from one or more input pulses of very short duration in a manner whereby neither the amplitude nor the shape of the output pulses are adversely affected as the repetition rate thereof increases.

It is still a further object of this invention to multiply the repetition rate of one or more input pulses of millimicrosecond duration in a compact device of uniquely simple and practical construction.

These and other objects of my invention are attained in one specific illustrative embodiment thereof wherein a traveling wave tube comprises an elongated evacuated envelope within and at opposite ends of which are positioned an electron and collector for forming and projecting an electron beam along an extended path therebetween. An elongated helical interaction circuit is disposed longitudinally within the envelope intermediate the electron gun and collector with signal input and output wave guide transducers coupled to the extreme ends of the circuit, respectively.

In accordance with an aspect of my invention, the repetition rate of a train of original input signal pulses is multiplied by a desired amount through the use of controlled "echo" pulses. As used hereinafter, "pulse" signifies any wave form of short duration other than sinusoidal and, therefore, is not limited to a single specific wave form commonly defined as such. These "echo" pulses are established by deliberately introducing a first reflection along the helix, preferably in an intermediate region thereof, such as by welding a small piece of metal to one or more turns of the helix at the desired point, and by introducing a second reflection downstream thereof at the proper point, preferably within the output wave guide transducer rather than on the helix for reasons that will become more apparent hereinafter. It is thus seen that the wave reflection means as embodied in the instant invention are purposely designed to be reflective at the mid-band frequency of the short pulses of applied signal wave energy. As used throughout the following description of the invention, the expression "downstream" signifies a closer proximity to the collector than the electron gun relative to a given point with which it is being compared, whereas "upstream" signifies the converse.

In accordance with the principles of this invention, a train of input signal pulses applied to the upstream end of the helix propagates therealong and, upon passing through the output wave guide the pulses are partially reflected back toward the upstream end of the helix until they reach the first reflection whereupon they are reflected back to the output wave guide by the first reflection on the helix. Advantageously, the gain of the device effected along the active helix through the cumulative interchange of energy between the electron beam and the propagating signal waves (resulting from both the input pulses and the "echo" pulses) assures that the generated ouput "echo" pulses will have adequate amplitude in comparison to the original input pulses that are amplified.

Moreover, such a unique traveling wave tube pulse multiplier obviates the necessity of complex regenerative circuitry, blocking oscillators and the like. Equally important is the fact that with a pulse multiplier designed in accordance with the principles of this invention, pulse rate multiplication may be effected with extremely short millimicrosecond pulses without distorting the basic shape of the input or driving pulses. Further, as the spacing between the output pulses is determined by the physical distance between the two reflection points, the pulse spacing, once adjusted, remains extremly stable.

In order to keep the system stable and insure synchronization with the input or driving pulses, the "round trip" gain of the device should be less than unity for each "echo" pulse. Thus the train of output "echo" pulses should normally decrease in amplitude. If the "round trip" gain were greater than one the device would then operate in a manner similar to that of a free-running oscillator or multivibrator.

In accordance with another aspect of this invention, a loss section, such as formed by a coating of Aquadag, for example, is positioned on or adjacent to the helix between the upstream end of the helix and the first reflection so as to absorb any portion of the initially reflected input pulse wave energy that is not subsequently reflected back toward the output of the device by the first reflection on the helix. As is well known, such a loss section also minimizes the tendency towards self-oscillation of the circuit which of course is an active element. It is usually desirable that the loss section be positioned near the middle of the helix with the first reflection adjacent thereto, since, then, the reflected "echo" pulse wave energy propagating toward the output will experience almost the full gain of the device. The amplitude of the "echo" pulses may therefore advantageously be built up to a level at the output of the device corresponding closely to that of the amplified input pulses.

In accordance with still another aspect of my invention, the second reflection, when positioned within the output wave guide, comprises an adjustable member, such as a slide screw tuner, for example, whereby the desired spacing between output pulses is easily controlled as well as the radio-frequency phase and amplitude of the "echo" pulses. Directional couplers with either predetermined or adjustable characteristics may also be utilized with equal effectiveness.

It is a feature of this invention that an interaction circuit of a traveling wave tube in combination with two spaced wave reflections, at least the first of which is positioned on an intermediate portion of the interaction circuit, be utilized to establish controlled output "echo" pulses of the proper radio-frequency phase and amplitude and which are synchronized with respect to an original input train of pulses, each of very short duration, such that a multiplication of the repetition rate of the input pulses is effected at the output in a stable manner and without distorting the original pulse shape.

It is another feature of this invention that a loss section be positioned on the interaction circuit on the side of the first reflection remote from the second reflection for absorbing any portion of the initially reflected pulse wave energy that is not subsequently reflected back toward the output of the device by the first reflection, as well as to minimize the tendency of the interaction circuit to break into self-oscillation.

It is a further feature of this invention that the second reflection be introduced to the propagating pulse wave energy at a point downstream of the first reflection, and be adjustable with respect to the propagating path such that the desired spacing between the output "echo" pulses as well as the radio-frequency phase and amplitude thereof are easily controlled.

Figure 2:
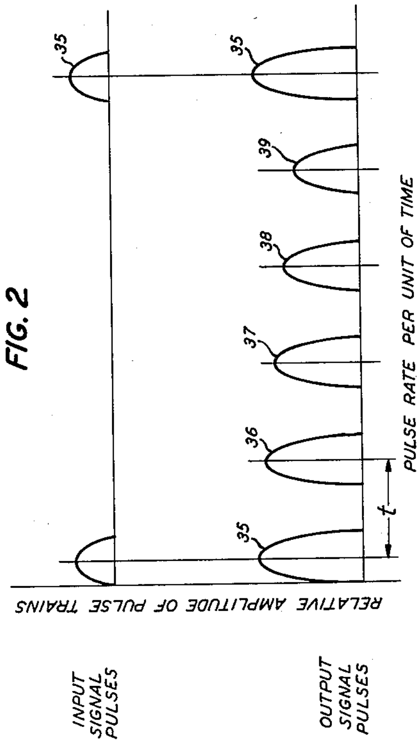

A complete understanding of this invention and of these and other features thereof may be gained from a consideration of the following detailed description taken in conjunction with the accompanying drawing, in which:

FIG. 1 is a sectional view of a traveling wave tube embodying the principles of this invention; and FIG. 2 is an illustrative plot of typical input and output pulse trains for the tube of FIG. 1.

Referring now more particularly to FIG. 1, there is depicted a traveling wave tube 10, comprising an elongated evacuated envelope 11, such as of glass, within which are positioned at opposite ends thereof, respectively, an electron gun 12 and a collector 13. The electron gun may be of any conventional type and is shown as including an indirectly heated cathode 14, a focusing electrode 15, and an accelerating electrode 16 for forming and projecting an electron beam along an extended path to the collector 13. For purposes of simplicity, neither the electrode support structure nor the lead-in connections to the various tube elements are shown. The electron flow would normally be focused by suitable and well known magnetic and/or electrostatic means, not here shown. Intermediate the electron gun 12 and collector 13 is an interaction circuit in the form of a conductive helix 20 positioned coaxially of the path of electron flow for propagating electromagnetic pulse wave energy therealong in coupling relation with the electron beam. While a conductive helix has been shown, it is to be understood that any of the well known forms of traveling wave interaction circuits may be utilized in accordance with the principles of this invention with equal effectiveness.

Pulse wave energy, which may comprise a train of very short input pulses having a time duration in the millimicrosecond range, for example, is applied to the upstream end of helix 20 by way of an input rectangular wave guide section 22 and coupling strip 23 from a pulse source 21. The coupling strip 23 is positioned to couple to the electric vector in the rectangular wave guide 22 which has a quarter wave length short-circuited end 28 opposite the input end of the guide. In order to effect a good impedance match between the input guide 22 and the upstream end of helix 20, there is a short impedance matching section 24 comprising a portion of the helix 20 along which the helix pitch gradually decreases to the desired value along the intermediate region thereof. The amplified pulse wave energy is abstracted, for utilization, at the downstream end of the helix 20 through a short impedance matching section 25, wherein the pitch of the helix is gradually increased. This section also comprises a coupling strip 26 and the output rectangular wave guide section 27 which includes a quarter wave length short-circuited end 29. It is to be understood, of course, that numerous other wave coupling techniques could be utilized with equal effectiveness in accordance with the principles of this invention. The pulse source 21 may comprise any of the well known pulse generators, but for extremely short pulses of millimicrosecond duration, a balanced crystal gate or modulator circuit operating in the astable or free-running state is very desirable.

In accordance with an aspect of this invention, the repetition rate of a given train of original radio-frequency input signal pulses, each of very short duration, is multiplied by a desired amount through the use of controlled "echo" pulses of the proper phase amplitude and spacing with respect to the original input pulses. These "echo" pulses are established by two reflections, at least one of which is located along an intermediate region of the helix 20. As shown in FIG. 1, the first reflection designated A may simply comprise a piece of metal 30 welded to one or more intermediate turns of the helix. Any other well known technique for presenting a discontinuity to the propagating wave may be utilized with equal effectiveness. The second reflection designated is located in the output wave guide 27 and may advantageously comprise a well known slide screw tuner 31, shown schematically. Such a tuner is adjustable both longitudinally and vertically within the wave guide as is illustrated by the arrows above the tuner 31. Longitudinal displacement of such a tuner along the wave guide directly changes the physical spacing between the two reflections and, thus, enables the desired spacing between the output "echo" pulses and, concomitantly, the number of "echo" pulses between successive input pulses to be readily controlled. Such displacement similarly enables the radio-frequency phase between the "echo" pulses and the original amplified input pulses to be synchronized. Vertical displacement of the tuner 31 within the guide determines the amount of output pulse wave energy reflected back toward the reflection A and, thus, concomitantly determines the amplitude of the output "echo" pulses. While a slide screw tuner has been schematically illustrated, it is pointed out that more elaborate and sophisticated structure could be employed in the output wave guide, such as a directional coupler which is also well known in the art. The latter type of coupler can be purchased commercially for sampling any predetermined amount of output wave energy from the main guide, which sampled energy could then be reflected back to the first reflection A by an adjustable short-circuited stub in the directional coupler. A variable attenuator in such a coupler could then be utilized to control the amplitude of the "echo" pulses. Moreover, while reflection B has been shown as being located within the output wave guide 27, it is pointed out that this second reflection B could also be located on or adjacent the helix 20 downstream of the first reflection A. The disadvantage of positioning reflection B on the helix resides in the fact that there is then no simple known technique for adjusting the radio-frequency phase and amplitude of the "echo" pulses. A short section of helix positioned coaxially of the envelope could be made adjustable axially therealong and utilized for varying the radio-frequency phase and pulse spacing; however, the amplitude of the "echo" pulses could not be adjusted as readily with such an arrangement as with the aforementioned apparatus utilized in the output wave guide. In any event, as the spacing between output pulses is determined primarily by the physical distance between the two reflection points A and B, the pulse spacing, once adjusted, remains extremely stable.

In accordance with another aspect of this invention, a loss section 33 comprising a dissipative material, such as Aquadag, is coated along the inner surface of the envelope 11 adjacent a plurality of intermediate turns of the helix 20 for absorbing any portion of the initially reflected pulse or "echo" energy that is not subsequently reflected back toward the output of the device. Such a loss section serves a second function of minimizing any tendency of the helix to break into self-oscillation. While the dissipative coating 33 has been shown as being applied to the inner surface of the envelope 11, it is to be understood that the coating could similarly be applied to the helix itself, or to other support structure adjacent thereto, especially in arrangements where the helix is positioned a substantial distance from the tube envelope, such as when support rods are utilized.

It is generally desirable that the loss section 33 be positioned at or near the middle of the helix with the first reflection A adjacent thereto, since then the reflected or "echo" pulse wave energy propagating toward the output wave guide will experience almost the full gain of the device. Accordingly, for any given application, the amplitude of the output "echo" pulses may advantageously be built up to a level that is adequate in comparison to the amplified input pulses. The only important limitation on the "round trip" gain of the "echo" pulses, i.e., the gain realized by the portion of the reflected pulse wave energy in traversing from reflection B to reflection A to reflection B, is that it should be less than unity for each "echo" pulse. In this manner the train of "echo" pulses decreases in amplitude so as to prevent undesired regenerative feedback.

The manner in which the device of FIG. 1 multiplies the repetition rate of an input pulse train is illustrated by the typical input and output pulse trains plotted in FIG. 2. As seen from the figure, between every two input pulses 35, the distance between reflections A and B, in a device such as of FIG. 1, is adjusted such that there are four output "echo" pulses designated 36 through 39, which successively decrease in amplitude. As such, it is seen that the input pulse repetition rate is increased by a factor of five to one. Of course, by properly positioning the second reflection at the proper distance with respect to the first reflection for a given input repetiton rate or frequency of operation, and by suitably adjusting the radio-frequency phase and amplitude of the "echo" pulses, any desired number of output "echo" pulses may be obtained for a given train of input pulses.

In operation, a train of input pulses from the pulse source 21 is applied to the helix 20 through the input wave guide 22 as indicated by the centered long-lined arrows in FIG. 1. The input pulses are then amplified in propagating along the helix 20, as indicated by the long-lined arrows, through the cumulative interchange of energy between the input pulse wave train and the electron beam. The amplified pulses are then abstracted at the downstream end of the helix 20 by the output coupling structure which includes the rectangular wave guide 27. A small portion of each pulse, upon reaching reflection B, is reflected back toward reflection A, as indicated by the curved arrow adjacent reflection B and the short-lined off-centered arrows pointing in the direction of reflection A from reflection B. This initially reflected portion of the output pulse upon reaching reflection A is again reflected back toward reflection B as indicated by the curved arrow adjacent reflection A. This portion of the original pulse that is reflected the second time constitutes the first "echo"

pulse which is amplified in propagating along the helix 20 from reflection A to B. Upon reaching reflection B again, a small portion of this first amplified "echo" pulse is again reflected back to reflection A, the remainder of the first "echo" pulse propagates past reflection B through the output wave guide 27 for utilization. The first amplified output "echo" pulse is illustrated in FIG. 2 as the pulse 36. As previously mentioned, the number of "echo" pulses between every two adjacent input pulses is dependent primarily on the physical spacing between the two reflections A and B for any given frequency of operation and, to a lesser degree, on the decrease in amplitude of successive output "echo" pulses that can be tolerated between every two original input pulses that are amplified for any given application.

By way of illustration, at an operating frequency of 10,000 megacycles it is not too difficult to utilize a balanced crystal gate of conventional design fed, for example, from the otuput of a continuous-wave klystron operating at 10,000 megacycles, to give an input train of pulses, each of 5 millimicroseconds' duration at a repetition rate of 10 million pulses per second. Such an input repetition rate would give a maximum usable time base of approximately 100 millimicroseconds between successive input pulses. By adjusting the distance between reflections A and B in accordance with the principles of this invention such that 9 "echo" pulses are uniformly spaced between successive input pulses at the output, a 10-fold increase in the original input pulse repetition rate would be effected at the output in a very stable manner. Moreover, the described technique of pulse rate multiplication advantageously can be applied to extremely short input pulses without distorting the basic pulse shape at the output.

As seen in FIG. 2 the output pulses 35 through 39 are of decreasing amplitude as the gain for each "echo" pulse is maintained less than unity. It is to be understood, however, that if constant amplitude output pulses are desired a clipper circuit, of types known in the art, may be positioned in the output wave guide 27 beyond the reflection B to limit the amplitude of the output pulses to a constant amount while still maintaining their abrupt and sharp wave shape. Similarly it is to be understood that each input pulse 35, which is applied at the first or low repetition rate to the traveling wave tube, coincides in traveling along the helix 24 with a reflected portion of the last output pulse which is at the second or high repetition rate; in this instance, input pulse 35 coincides with a portion of pulse 39 reflected from the reflection B in the output wave guide and then reflected back along the helix from the reflection A. However, by appropriate design of the helix 24 and other tube parameters the overall gain of the interaction circuit in the region adjacent the output wave guide may be limited so that the resultant output pulse 35 is not the sum of the amplified pulses due to these two separate pulses coincidently traveling along the helix; further, by incorporation in the circuitry of the clipper circuit, referred to above, and by limiting the gain of the tube, either constant amplitude output pulses or output pulses having amplitudes within a specified range may be produced.

While the described operation of the pulse multiplier depicted in FIG. 1 has been considered from the standpoint of utilizing only the fundamental forward wave along the helix for amplifying the original and "echo" pulses, it is obvious that backward wave amplification could similarly be utilized if desired. In that case, the reflection B would be positioned upstream of reflection A. Further, while the operation of the device has been described in terms of increasing the repetition rate of a train of input pulses, it is readily apparent from the foregoing principles of this invention that a large number of "echo" pulses may be generated from a single or random series of input pulses.

It is to be understood that the specific embodiment described herein is merely illustrative of the general principles of the instant invention. Numerous other structural arrangements and modifications may be devised in the light of this disclosure by those skilled in the art without departing from the spirit and scope of this invention.

What is claimed is:

1. A traveling wave tube for generating short pulses of wave energy at high repetition rates comprising an evacuated envelope, an electron gun for projecting an electron beam, a collector electrode, a wave interaction circuit between said electron gun and said collector and traversed by said beam, first wave guide means coupled to one end of said wave interaction circuit for introducing short-length input pulses of signal wave energy at a first repetition rate to said wave interaction circuit, second wave guide means coupled to the other end of said interaction circuit for abstracting amplified pulse wave energy propagating therealong and first and second wave reflecting means spaced apart along the wave propagating path, at least the first of which is contiguous to said wave interaction circuit, the two reflecting means being reflective at the frequency of said input signal wave energy and producing "echo" pulses synchronized with respect to said input pulses such that the repetition rate of said input pulses is multiplied in passing through said traveling wave tube.

2. A traveling wave tube in accordance with claim 1 wherein said wave interaction circuit comprises a helix and said second reflecting means comprises a movable reflection member in said second wave guide means for adjusting the radio-frequency phase and amplitude of said "echo" pulses and for controlling the number of "echo" pulses between successive input pulses.

3. A traveling wave tube in accordance with claim 1 further comprising dissipative loss means positioned contiguous to said interaction circuit on the side of said first reflecting means remote from said second reflecting means for absorbing pulse wave energy not reflected back toward the second of said two reflecting means from the first of said two reflecting means.

4. A traveling wave tube in accordance with claim 3 wherein said wave interaction circuit comprises a helix.

5. A traveling wave tube for generating short pulses of wave energy at high repetition rates comprising an evacuated envelope, an electron gun for projecting an electron beam, a collector electrode, a helix interaction circuit between said gun and said collector and traversed by said beam, first wave guide means coupled to one end of said helix for introducing short-length input pulses of wave energy at a first repetition rate thereto, first reflecting means on said helix, second wave guide means coupled to the other end of said helix, and second reflecting means in said second wave guide means whereby said short-length input pulses are transmitted to said second wave guide means at a higher repetition rate, said first and second wave reflecting means being reflective at the frequency of said input wave energy.

6. A traveling wave tube in accordance with claim 5 further comprising loss means on said helix between said first reflecting means and said one end of said helix for absorbing pulse wave energy not reflected back along said helix toward said second reflecting means by said first reflecting means.

7. A traveling wave tube in accordance with claim 5 wherein said second reflecting means comprises a movable reflection member in said second wave guide means for adjusting the radio-frequency phase and amplitude of said pulses transmitted to said second wave guide means.

References Cited in the file of this patent

UNITED STATES PATENTS

| | | |
|---|---|---|
| 2,482,974 | Gordon | Sept. 27, 1949 |
| 2,626,371 | Barnett et al. | Jan. 20, 1953 |
| 2,770,722 | Arams | Nov. 13, 1956 |
| 2,795,698 | Cutler | June 11, 1957 |